(12) United States Patent
Yamauchi et al.

(10) Patent No.: US 12,141,836 B2
(45) Date of Patent: Nov. 12, 2024

(54) INFORMATION DISPLAY METHOD AND INFORMATION PROCESSING DEVICE

(71) Applicant: Panasonic Intellectual Property Corporation of America, Torrance, CA (US)

(72) Inventors: Masaki Yamauchi, Osaka (JP); Nanami Fujiwara, Osaka (JP); Takeshi Kawaguchi, Cupertino, CA (US)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 17/690,320

(22) Filed: Mar. 9, 2022

(65) Prior Publication Data

US 2022/0198515 A1    Jun. 23, 2022

Related U.S. Application Data

(63) Continuation of application No. PCT/JP2021/003531, filed on Feb. 1, 2021.

(60) Provisional application No. 62/983,039, filed on Feb. 28, 2020.

(51) Int. Cl.
*G06Q 30/0251*    (2023.01)
*G06Q 30/0272*    (2023.01)
*G09F 13/10*    (2006.01)

(52) U.S. Cl.
CPC ..... *G06Q 30/0255* (2013.01); *G06Q 30/0267* (2013.01); *G06Q 30/0269* (2013.01); *G06Q 30/0272* (2013.01); *G09F 13/10* (2013.01)

(58) Field of Classification Search
CPC ........................ G06Q 30/0255; G06Q 30/0269
See application file for complete search history.

(56) References Cited

U.S. PATENT DOCUMENTS

| | | | |
|---|---|---|---|
| 9,628,286 B1* | 4/2017 | Nguyen | G08B 13/19678 |
| 2010/0179857 A1* | 7/2010 | Kalaboukis | G06Q 20/208 |
| | | | 705/26.1 |
| 2015/0113454 A1* | 4/2015 | McLaughlin | G06F 3/013 |
| | | | 715/765 |
| 2017/0228774 A1* | 8/2017 | Sallas | G06Q 30/0255 |
| 2018/0068019 A1* | 3/2018 | Novikoff | G06F 16/739 |

FOREIGN PATENT DOCUMENTS

JP    2011-77913    4/2011

OTHER PUBLICATIONS

International Search Report issued Apr. 27, 2021 in International (PCT) Application No. PCT/JP2021/003531.

* cited by examiner

*Primary Examiner* — Mario C. Iosif

(74) *Attorney, Agent, or Firm* — Wenderoth, Lind & Ponack, L.L.P.

(57) ABSTRACT

A processor obtains first article information related to a first article which is owned by a first user and which is placed in front of or behind a transparent display, obtains, based on the first article information, an advertisement related to a product or a service which has been used by a second user who owns a second article related to the first article and who is different from the first user, and informs the first user of the advertisement.

11 Claims, 9 Drawing Sheets

INFORMATION DISPLAY METHOD AND INFORMATION PROCESSING DEVICE

CROSS REFERENCE TO RELATED APPLICATIONS

This is a continuation application of PCT International Application No. PCT/JP2021/003531 filed on Feb. 1, 2021, designating the United States of America, which is based on and claims priority of U.S. Provisional Patent Application No. 62/983,039 filed on Feb. 28, 2020. The entire disclosures of the above-identified applications, including the specifications, drawings and claims are incorporated herein by reference in their entirety.

FIELD

The present disclosure relates to an information display method and an information processing device.

BACKGROUND

A technique of distributing advertising information to a user is known (see, for example, Patent Literature (PTL) 1).

CITATION LIST

Patent Literature

PTL 1: Japanese Unexamined Patent Application Publication No. 2011-77913

SUMMARY

Technical Problem

However, the technique disclosed in PTL 1 requires further improvement on the customer appeal of the distributed advertising information to the user.

In view of the above, the present disclosure provides an information display method and an information processing device which are capable of improving the customer appeal of an advertisement to the user.

Solution to Problem

An information display method according to one aspect of the present disclosure is an information display method performed by an information processing device which includes a first transparent display that displays an image and a processor. The information display method includes the following performed by the processor: obtaining first article information related to a first article placed in front of or behind the first transparent display, the first article being owned by a first user; obtaining, based on the first article information, a first advertisement related to a product or a service which has been used by a second user, the second user being different from the first user and owning a second article related to the first article; and informing the first user of the first advertisement.

An information processing device according to another aspect of the present disclosure includes a transparent display which displays an image; and a processor. The processor performs the following: obtaining first article information related to a first article which is owned by a first user and is placed in front of or behind the transparent display; obtaining, based on the first article information, an advertisement related to a product or a service which has been used by a second user, the second user being different from the first user and owning a second article related to the first article; and informing the first user of the advertisement.

An information display method according to another aspect of the present disclosure is an information display method performed by an information processing device which includes a display device that displays an image and a processor. The information display method includes the following performed by the processor: obtaining first article information related to a first article which is owned by a first user and is placed in front of or behind the display device; obtaining, based on the first article information, a first advertisement related to a product or a service which has been used by a second user, the second user being different from the first user and owning a second article related to the first article; and informing the first user of the first advertisement.

An information processing device according to another aspect of the present disclosure includes: a display device which displays an image; and a processor. The processor performs the following: obtaining first article information related to a first article which is owned by a first user and is placed in front of or behind the display device; obtaining, based on the first article information an advertisement related to a product or a service which has been used by a second user, the second user being different from the first user and owning a second article related to the first article; and informing the first user of the advertisement.

General and specific aspects disclosed above may be implemented using a system, a method, an integrated circuit, a computer program, or a computer-readable recording medium, such as a compact disc-read only memory (CD-ROM) or any combination of systems, methods, integrated circuits, computer programs, or computer-readable recording media.

Advantageous Effects

An information display method and the like according to one aspect of the present disclosure is capable of improving the customer appeal of an advertisement to the user.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

Figure 1:
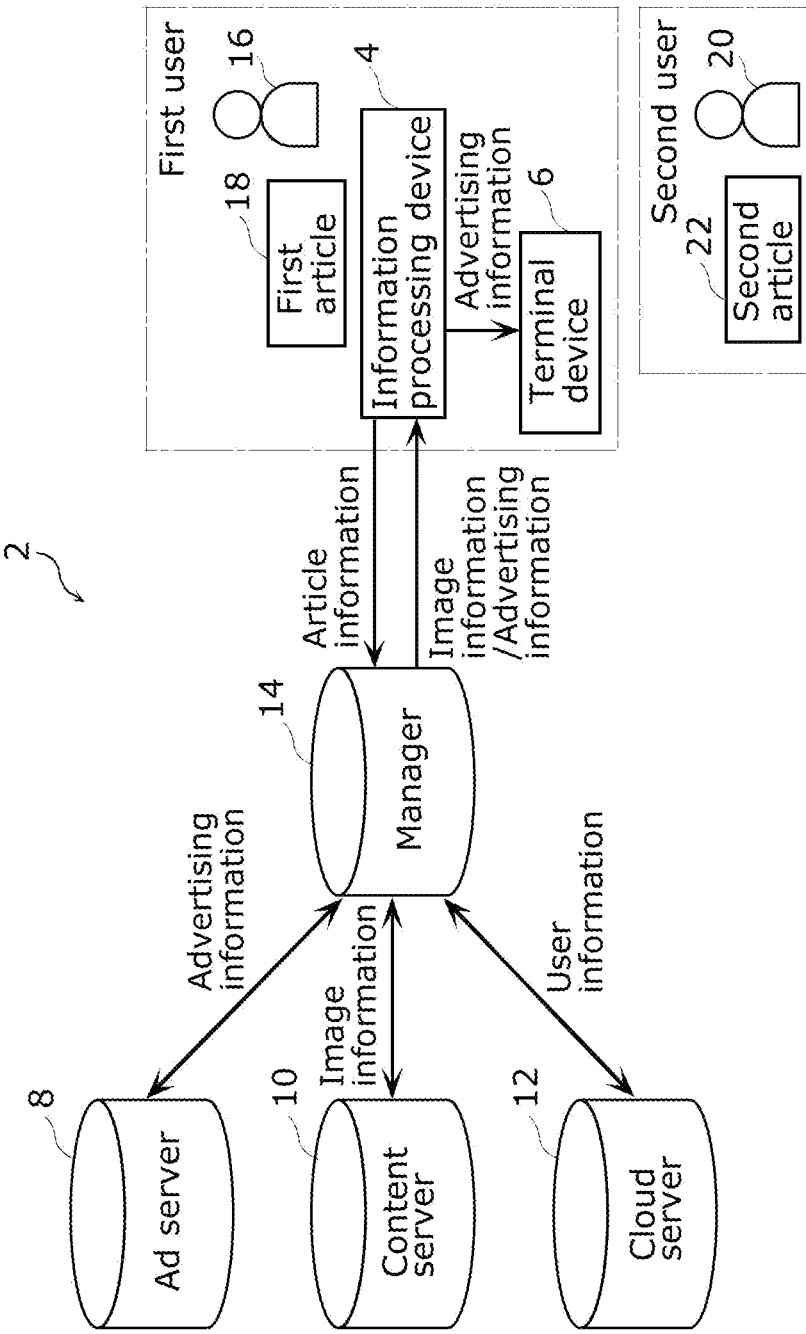
FIG. 1 schematically illustrates a system according to an embodiment.

Underlying Knowledge Forming Basis of the Present Disclosure

In relation to the technique disclosed in the Background section, the inventors have found the problem described below.

A main object of advertisement is to lead a user who sees the advertisement to the final result (conversion) such as product purchase, membership registration, document request, or inquiries. As a technique for realizing the object, for example, PTL 1 is known. In PTL 1, a sensor detects whether or not the user is looking at the image displayed on the display, and when the sensor detects that the user is looking at the image, advertising information is distributed to the terminal device of the user.

However, in the technique disclosed in PTL 1, an advertisement associated with the image is merely displayed on the terminal device. Hence, the user does not always show an interest in the content of the displayed advertisement. Accordingly, the customer appeal of the advertisement to the user might not be obtained.

The present disclosure has been conceived based on such findings. As a result of intensive studies by the inventors of the present application, the inventors have arrived at an idea of an information display method and an information processing device which are capable of improving the customer appeal of an advertisement to the user.

An information display method according to one aspect of the present disclosure is an information display method performed by an information processing device which includes a first transparent display that displays an image and a processor. The information display method includes the following performed by the processor: obtaining first article information related to a first article placed in front of or behind the first transparent display, the first article being owned by a first user; obtaining, based on the first article information, a first advertisement related to a product or a service which has been used by a second user, the second user being different from the first user and owning a second article related to the first article; and informing the first user of the first advertisement.

With this, when the first user places the first article in front of or behind the first transparent display, the first user is informed of the first advertisement related to the product or the service which has been used by the second user who owns the second article related to the first article. At this time, since the first article and the second article are related to each other, the first user and the second user are likely to have similar hobbies and interests. Hence, the first user is likely to become highly interested in the product or the service which has been used by the second user. Accordingly, it is possible to improve the customer appeal of the first advertisement to the first user by informing the first user of the first advertisement related to the product or the service which has been used by the second user.

For example, it may be that the information display method further includes the following performed by the processor: displaying a first image related to the first article on the first transparent display based on the first article information, in which the obtaining of the first advertisement includes, performed by the processor, obtaining, via a network, the first advertisement related to the product or the service which is related to the first image and which has been used by the second user.

With this, the first image related to the first article is displayed on the first transparent display, which attracts the interest of the first user. In addition, since the first user is informed of the first advertisement related to the product or the service related to the first image, the first user is likely to become highly interested in the first advertisement, leading to an improved customer appeal of the first advertisement to the first user.

In addition, for example, it may be that the information processing device further includes a sensor which detects a line of sight of the first user, and the informing includes, performed by the processor, informing the first user of the first advertisement based on a detection result of the sensor, when the first user is looking at both the first article and the first image and a period during which the first user is looking at the first image is greater than or equal to a predetermined period.

With this, it is possible to estimate that the first user is highly interested in the first image, when the first user is looking at both the first article and the first image and the period during which the first user is looking at the first image is greater than or equal to the predetermined period. Hence, in such a case, by informing the first user of the first advertisement related to the first image, the first user is likely to become highly interested in the first advertisement, leading to an improved customer appeal of the first advertisement to the first user.

For example, it may be that the information display method further includes the following performed by the processor: stopping displaying the first image, and displaying a second image related to the first article and different from the first image on the first transparent display, when the period during which the first user is looking at the first image is less than the predetermined period; and informing the first user of a second advertisement related to the second image, when the first user is looking at both the first article and the second image and a period during which the first user is looking at the second image is greater than or equal to the predetermined period, the second advertisement being related to a product or a service which has been used by the second user.

With this, when the period during which the first user is looking at the first image is less than the predetermined period, it is possible to estimate that the first user is not interested in the first image. Accordingly, in such a case, by switching the display on the first transparent display from the first image to the second image, it is possible to avoid informing the first user of the first advertisement in which the first user would probably not be interested.

For example, it may be that the information display method further includes the following performed by the processor: informing the first user of place information indicating a place related to the first image, in which the place is a place where the first user has no visit history, and the visit history is obtained from a database where the first user stores data.

With this, the first user is informed of place information which associates the first image with the first advertisement, so that it is possible to reduce the feeling of suddenness felt by the first user when the first user is informed of the first advertisement. In addition, since the place information is information indicating the place where the first user has no visit history, the first user is likely to become interested and think that "I would like to visit there", leading to an improved customer appeal of the first advertisement to the first user.

For example, it may be that the information display method further includes the following performed by the processor: informing the first user of place information indicating a place related to the first image, in which the place is a place where the first user has a visit history, and the visit history is obtained from a database where the first user stores data.

With this, since the first user is informed of the place information which associates the first image and the first advertisement, it is possible to reduce the feeling of suddenness felt by the first user when the first user is informed of the first advertisement. Since the place information is information indicating the place where the first user has a visit history, the first user is likely to become interested and think that "I would like to visit there again", leading to an improved customer appeal of the first advertisement to the first user.

For example, it may be that the informing of the first advertisement includes, performed by the processor, informing the first user of the first advertisement, when an input made by the first user for the place information is received by a user interface.

With this, it is possible to inform the first user of the first advertisement when the first user takes an action relative to the place information.

For example, it may be that the information display method further includes the following performed by the processor: obtaining time-of-year information indicating a time of year related to the first image; and informing the first user of the time-of-year information obtained.

With this, since the first user is informed of the time-of-year information indicating the time of the year related to the first image, the first user is capable of considering use of the product or the service of the first advertisement in light of the time of the year indicated by the time-of-year information.

For example, it may be that the information display method further includes the following performed by the processor: obtaining position information and decoration image information, the position information indicating a position of the second article placed by the second user for decoration, the decoration image information indicating an image of the second article captured, in which the displaying includes, performed by the processor, displaying the first image indicating a decorated state of the second article on the first transparent display based on the position information and the decoration image information.

With this, it is possible to increase the interest of the first user relative to the first image by displaying the first image which indicates a decorated state of the second product on the first transparent display.

For example, it may be that the obtaining of the first advertisement includes, performed by the processor, obtaining, via a network, the first advertisement selected based on second article information and a usage history of the product or the service by the second user, the second article information being related to the second article placed in front of or behind a second transparent display different from the first transparent display.

With this, since the second user has the second article placed in front of or behind the second transparent display, the first user and the second user are likely to have very similar hobbies and interests. Hence, the first user is likely to become highly interested in the product or the service which has been used by the second user. Accordingly, by informing the first user of the first advertisement related to the product or the service which has been used by the second user, it is possible to improve the customer appeal of the first advertisement to the first user.

For example, it may be that the information display method further includes the following performed by the processor: obtaining relative position information when a third advertisement related to a product or a service is displayed on the second transparent display, the relative position information indicating a position of the third advertisement relative to the second article, the third advertisement having led the second user to use the product or the service, in which the informing includes, performed by the processor, informing the first user of the first advertisement by displaying the first advertisement on the first transparent display based on the relative position information.

With this, it is possible to increase the possibility that the first user uses the product or the service of the first advertisement, by displaying the first advertisement on the first transparent display based on the relative position information in light of the record in which the second user has been led to use the product or the service.

For example, it may be that the information display method further includes the following performed by the processor: informing the first user of user information related to the second user along with the first advertisement.

With this, it is possible to increase the possibility that the first user uses the product or the service of the first advertisement by being inspired by the second user.

For example, it may be that the informing includes, performed by the processor, informing the first user of the first advertisement by displaying the first advertisement on the first transparent display.

With this, it is possible to effectively attract the attention of the first user to the first advertisement by displaying the first advertisement on the first transparent display.

For example, it may be that the informing includes, performed by the processor, informing the first user of the first advertisement by displaying the first advertisement on a terminal device that is operated by the first user.

With this, it is possible to effectively attract the attention of the first user to the first advertisement by displaying the first advertisement on the terminal device.

An information processing device according to one aspect of the present disclosure includes: a transparent display which displays an image; and a processor. The processor performs the following: obtaining first article information related to a first article which is owned by a first user and is placed in front of or behind the transparent display; obtaining, based on the first article information, an advertisement related to a product or a service which has been used by a second user, the second user being different from the first user and owning a second article related to the first article; and informing the first user of the advertisement.

With this, when the first user places the first article in front of or behind the transparent display, the first user is informed of an advertisement related to the product or the service which has been used by the second user who owns the second article related to the first article. At this time, since the first article and the second article are related to each other, the first user and the second user are likely to have similar hobbies and interests. Hence, the first user is likely to become highly interested in the product or the service which has been used by the second user. Accordingly, it is possible to improve the customer appeal of the advertisement to the first user by informing the first user of the advertisement related to the product or the service which has been used by the second user.

An information display method according to one aspect of the present disclosure is an information display method performed by an information processing device which includes a display device that displays an image and a processor. The information display method includes the following performed by the processor: obtaining, based on the first article information, first article information related to a first article which is owned by a first user and is placed in front of or behind the display device; obtaining a first advertisement related to a product or a service which has been used by a second user, the second user being different from the first user and owning a second article related to the first article; and informing the first user of the first advertisement.

With this, when the first user places the first article in front of or behind the display device, the first user is informed of the first advertisement related to the product or the service which has been used by the second user who owns the second article related to the first article. At this time, since the first article and the second article are related to each other, the first user and the second user are likely to have similar hobbies and interests. Hence, the first user is likely to become highly interested in the product or the service which has been used by the second user. Accordingly, it is possible to improve the customer appeal of the first advertisement to the first user by informing the first user of the first advertisement related to the product or the service which has been used by the second user.

An information processing device according to one aspect of the present disclosure includes: a display device which displays an image; and a processor. The processor performs the following: obtaining first article information related to a first article which is owned by a first user and is placed in front of or behind the display device; obtaining, based on the first article information, an advertisement related to a product or a service which has been used by a second user, the second user being different from the first user and owning a second article related to the first article; and informing the first user of the advertisement.

With this, when the first user places the first article in front of or behind the display device, the first user is informed of an advertisement related to the product or the service which has been used by the second user who owns the second article related to the first article. At this time, since the first article and the second article are related to each other, the first user and the second user are likely to have similar hobbies and interests. Hence, the first user is likely to become highly interested in the product or the service which has been used by the second user. Accordingly, it is possible to improve the customer appeal of the advertisement to the first user by informing the first user of the advertisement related to the product or the service which has been used by the second user.

General and specific aspects disclosed above may be implemented using a system, a method, an integrated circuit, a computer program, or a computer-readable recording medium, such as a CD-ROM or any combination of systems, methods, integrated circuits, computer programs, or computer-readable recording media.

Hereinafter, an embodiment will be specifically described with reference to the drawings.

Note that the embodiment described below shows a general or specific example. The numerical values, shapes, materials, structural components, the arrangement and connection of the structural components, steps, the processing order of the steps etc. shown in the following embodiment are mere examples, and therefore do not limit the present disclosure. Among the structural components in the following embodiment, structural components not recited in any one of the independent claims defining the most generic part are described as arbitrary structural components.

Embodiment

1. Outline of System

First, with reference to FIG. 1, an outline of system 2 according to an embodiment will be described. FIG. 1 schematically illustrates an outline of system 2 according to the embodiment.

As illustrated in FIG. 1, system 2 includes information processing device 4, terminal device 6, ad server 8, content server 10, cloud server 12, and manager 14.

Information processing device 4 is provided in the house of first user 16, for example, and is capable of communicating with manager 14 via network 24 (see FIG. 2 to be described later). Information processing device 4 includes a function of displaying an image. First user 16 places first article 18 at a position in proximity to information processing device 4 to decorate the room. At this time, information processing device 4 transmits first article information related to first article 18 to manager 14.

Terminal device 6 is a terminal device that is operated by first user 16, and is, for example, a smart phone, a tablet terminal, or a personal computer. Terminal device 6 is capable of communicating with information processing device 4 via network 24. Terminal device 6 has functions of displaying an image and outputting sound.

Ad server 8 is a server which stores a plurality of advertising information each indicating an advertisement. Ad server 8 is capable of communicating with manager 14 via network 24.

Here, the term "advertisement" refers to, for example, a purchase suggestion for a product or a service, document request, inquiry, or prompting each user for membership registration to a specific website or service. Examples of the product or the service include groceries, furniture, home appliances, accessories, trips, hotels, air tickets, and outsourcing services. The advertisement may be a suggestion to each user for completion of an actual e-commerce transaction, or for access to a predetermined service provider. The advertisement may also be advertising content obtained via an advertising agency.

Content server 10 is a server which stores a plurality of image information indicating images, and is capable of communicating with manager 14 via network 24.

Cloud server 12 is a server which stores a plurality of user information related to respective users including first user 16 and second user 20 different from first user 16. Cloud server 12 is capable of communicating with manager 14 via network 24. Cloud server 12 does not have to be provided outside the house of first user 16, but may be provided inside the house of first user 16 as a home server, or may be included in information processing device 4.

Manager 14 is a server which manages the entirety of system 2. Manager 14 may be, for example, a data management platform (DMP). Manager 14 refers to content server 10 based on the first article information from information processing device 4 to select image information that indicates an image related to first article 18. Manager 14 obtains the selected image information from content server 10, and transmits the obtained image information to information processing device 4. Accordingly, an image for decorating first article 18 is displayed on information processing device 4.

In addition, manager 14 refers to ad server 8 and cloud server 12 based on the first article information from information processing device 4 to select advertising information indicating an advertisement related to a product or a service which is related to the image indicated by the selected image information and which has been used by second user 20 who owns second article 22 related to first article 18. Manager 14 obtains the selected advertising information from ad server 8, and transmits the obtained advertising information to information processing device 4. Accordingly, information processing device 4 transmits the advertising information from manager 14 to terminal device 6, and advertisement indicated by the advertising information from information processing device 4 is displayed on terminal device 6.

2. Functional Configuration of System

Next, with reference to FIG. 2, a functional configuration of system 2 according to the embodiment will be described. FIG. 2 is a block diagram illustrating a functional configuration of system 2 according to the embodiment.

Figure 2:
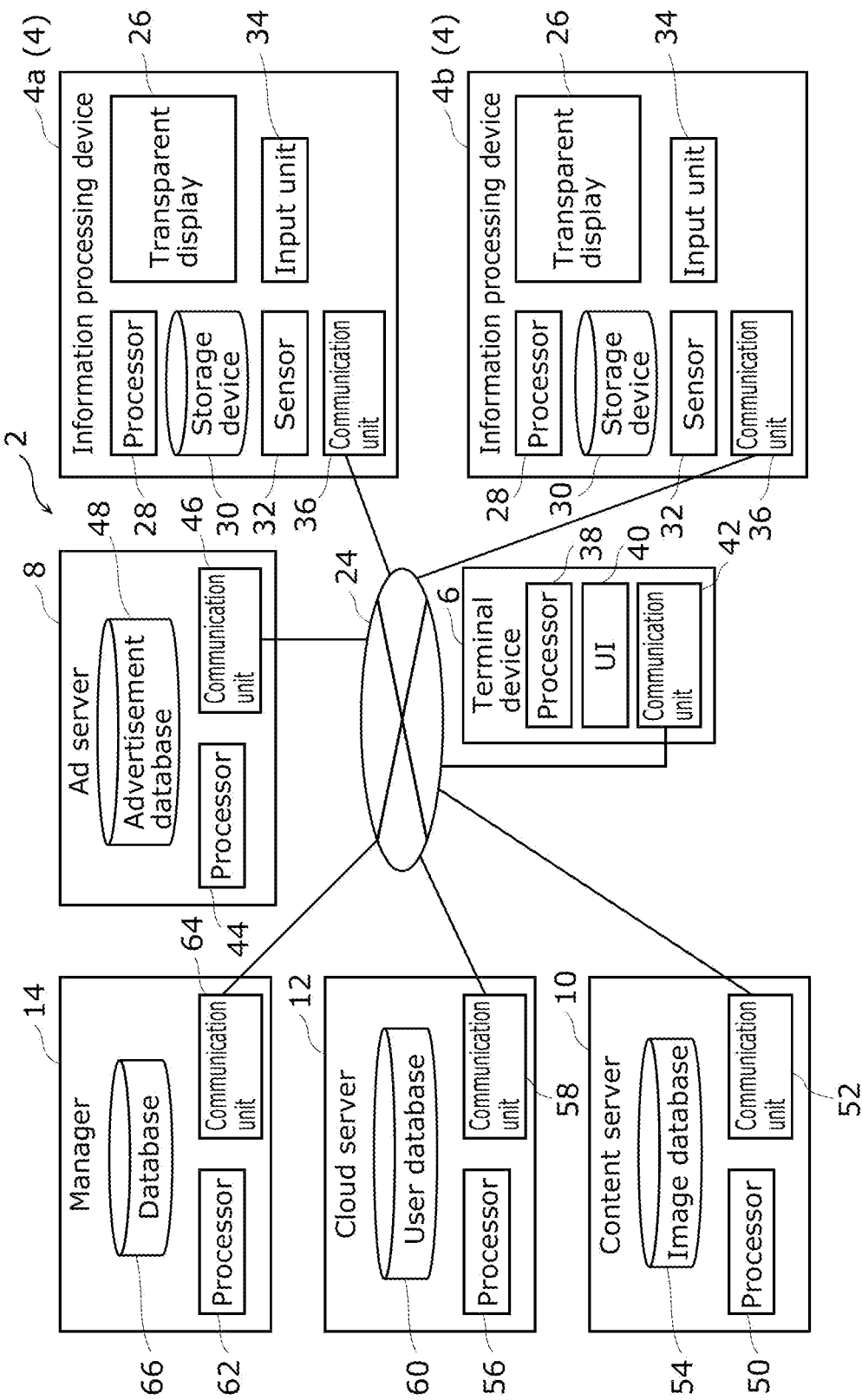
FIG. 2 is a block diagram illustrating a functional configuration of the system according to the embodiment.

As illustrated in FIG. 2, system 2 includes information processing device 4*a*(4), information processing device 4*b*(4), terminal device 6, ad server 8, content server 10, cloud server 12, and manger 14. Each of information processing devices 4*a*, 4*b*, terminal device 6, ad server 8, content server 10, cloud server 12, and manager 14 is connected to network 24, such as the Internet.

Information processing device 4*a* includes transparent display 26 (an example of a first transparent display), processor 28, storage device 30, sensor 32, input unit 34, and communication unit 36. Information processing device 4*a* is owned by first user 16.

Transparent display 26 includes, for example, a transmissive transparent display, such as a transparent inorganic electro-luminescent (EL) display, a transparent organic EL display, or a transmissive liquid crystal display (LCD). Shelf 78 (see FIG. 3 to be described later) for placing first article 18 is provided in proximity to transparent display 26. Transparent display 26 displays an image for decorating first article 18 placed on shelf 78.

Processor 28 executes various processes for controlling information processing device 4*a* by using storage device 30. For example, processor 28 controls display of an image on transparent display 26.

Storage device 30 stores image information, a program, and the like. Storage device 30 is, for example, a semiconductor memory, such as a random access memory (RAM), a read only memory (ROM), a flash memory, an erasable programmable read only memory (EPROM), or an electrically erasable programmable read only memory (EEPROM) (registered trademark). The semiconductor memory may be a non-volatile memory or a volatile memory. Storage device 30 may also be, for example, a magnetic disk, a flexible disk, an optical disk, a compact disc, a mini disk, a digital versatile disc (DVD) or the like, other than the semiconductor memory.

Sensor 32 is, for example, a camera sensor, and detects first article 18 placed on shelf 78. Specifically, sensor 32 outputs first article information related to first article 18 placed on shelf 78. The first article information indicates, for example, presence or absence, position, the number of items, and type of first article 18, and time and time of the year first article 18 was placed on shelf 78 or period during which first article 18 is placed on shelf 78. It is to be noted that sensor 32 does not have to be included in information processing device 4. In such a case, it may be that first article 18 is detected by a device other than information processing device 4, for example, a camera sensor of a smart phone owned by the user, and that information processing device 4 receives information detected by the camera sensor from the smart phone via network 24.

Moreover, sensor 32 detects the line of sight of first user 16 present in front of (on the interior side of) transparent display 26. Specifically, sensor 32 detects, for example, the movement of the eyes of first user 16, the direction and movement of the line of sight, and the position (range) of the attention. Examples of the line-of-sight detection method performed by sensor 32 include a detection method based on the position relationship between the inner corner of the eye and the iris, and a detection method based on the position relationship between the pupil and the position of the corneal reflection of an infrared ray generated when the infrared ray output from an infrared light emitting diode (LED) is emitted to the eye of first user 16. Moreover, the measurement of the range such as effective visual field can be executed by, for example, a staircase method or a probit method.

Input unit 34 is a user interface for receiving an input (command) from first user 16, and is, for example, a keyboard, a mouse, a switch, a microphone, or a touch sensor provided on transparent display 26. Input unit 34 receives, as an input from first user 16, for example, on and off of display of an image and a change in display of an image on transparent display 26. Input unit 34 may also receive, as an input from first user 16, information indicating the details of first article 18 (type, the number of items, and the like) placed on shelf 78, for example.

Communication unit 36 is a communication interface for performing wired or wireless communication with network 24. Communication unit 36 downloads or uploads information of various types via network 24.

Information processing device 4*b* includes transparent display 26 (an example of a second transparent display), processor 28, storage device 30, sensor 32, input unit 34, and communication unit 36, in a similar manner to information processing device 4*a* described above. Information processing device 4*b* is owned by second user 20. The functional configuration of information processing device 4*b* is the same as the functional configuration of information processing device 4*a* described above, and thus, the description thereof is omitted.

Terminal device 6 includes processor 38, user interface (UI) 40, and communication unit 42.

Processor 38 performs various processes for controlling terminal device 6. User interface 40 is, for example, a touch panel or a microphone, and receives an input from first user 16. Communication unit 42 is a communication interface for performing wireless communication with network 24.

Ad server 8 includes processor 44, communication unit 46, and advertisement database 48.

Processor 44 performs various processes for controlling ad server 8. Communication unit 46 is a communication interface for performing wired or wireless communication with network 24. Advertisement database 48 is a database in which advertising information indicating various advertisements 88 (see FIG. 6 and FIG. 7 to be described later) is accumulated.

Content server 10 includes processor 50, communication unit 52, and image database 54.

Processor 50 performs various processes for controlling content server 10. Communication unit 52 is a communication interface for performing wired or wireless communication with network 24.

Image database 54 is a database in which image information indicating various images are accumulated. In the image information accumulated in image database 54, place information indicating the place related to the image indicated by the image information is associated with the time-of-year information indicating the time of the year related to the image indicated by the image information. For example, in the case where the image information is an image of a starry sky in Hokkaido in January, the place information indicates "Hokkaido" as the place where the image was captured, and the time-of-year information indicates "January" as the time of the year when the image was captured.

Cloud server 12 includes processor 56, communication unit 58, and user database 60.

Processor 56 performs various processes for controlling cloud server 12. Communication unit 58 is a communication interface for performing wired or wireless communication with network 24.

User database 60 is a database in which user information related to respective users including first user 16 and second user 20 is accumulated. Examples of the user information include a) personal information of each user, such as a name, age, sex, and address, b) usage history and purchase history of products or services of each user, c) image information such as pictures stored by each user, and d)information indicating a visit history (activity history) including position information of each user. The user information may be obtained, for example, from information processing devices 4a, 4b, or may be obtained by using an application programming interface (API) provided by a social networking service (SNS). The user information accumulated in user database 60 is uploaded to network 24 via communication unit 58 by the computation process performed by processor 56.

Manager 14 includes processor 62, communication unit 64, and database 66.

Processor 62 performs various processes for controlling manager 14. Communication unit 64 is a communication interface for performing wired or wireless communication with network 24. Database 66 is a database in which information of various types and programs are accumulated. Not all of the functions of manager 14 need to be performed on the cloud, but it may be that the functions of manager 14 are hierarchically structured so that the functions of part of the layers are distributed to the home server and/or information processing devices 4a, 4b.

3. Configuration of Information Processing Device

Figure 3:
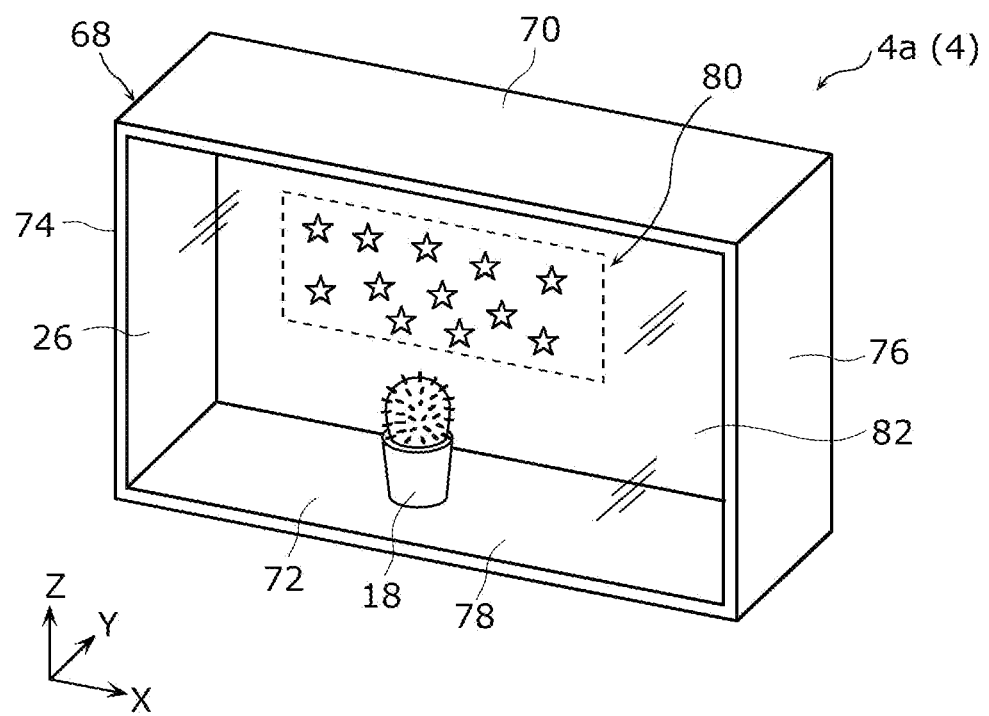
FIG. 3 is a perspective view illustrating an appearance of an information processing device according to the embodiment.

Next, with reference to FIG. 3, a configuration of information processing device 4a (4) according to the embodiment will be described. FIG. 3 is a perspective view illustrating an appearance of information processing device 4a according to the embodiment. It should be noted that, in FIG. 3, the horizontal direction of information processing device 4a is referred to as an X-axis direction, the depth direction of information processing device 4a is referred to as a Y-axis direction, and the vertical direction of information processing device 4a is referred to as a Z-axis direction. Since the configuration of information processing device 4b is the same as the configuration of information processing device 4a, the description thereof will be omitted.

Information processing device 4a is a device for creating an effect in a room (hereinafter, also referred to as "space") in, for example, the house of first user 16. As illustrated in FIG. 3, information processing device 4a includes frame body 68 and transparent display 26.

Frame body 68 has a quadrilateral shape in a plan view of an XZ plane. Frame body 68 is a window frame installed in a quadrilateral opening in an exterior wall (not illustrated) of a building, for example. Frame body 68 includes upper wall 70, lower wall 72, left side wall 74, and right side wall 76. Upper wall 70 and lower wall 72 are opposed to each other in the vertical direction (the Z-axis direction). Left side wall 74 and right side wall 76 are opposed to each other in the horizontal direction (the X-axis direction). Lower wall 72 functions as shelf 78 for placing first article 18. First user 16 is capable of placing first article 18 that first user 16 likes on shelf 78 as part of the interior accessories of the room. In the example illustrated in FIG. 3, first article 18 is a house plant (cactus). However, first article 18 is not limited to such an example, and may be, for example, a figure, an accessory, a book, a wine bottle, a light snack, a picture frame, a clock, a wristwatch, a decorative small item, a vase, a toy, a model, a painting, or the like. In addition, first article 18 or second article 22 may be placed on a shelf provided in proximity to frame body 68, instead of lower wall 72 of frame body 68.

Transparent display 26 has a quadrilateral shape in a plan view of an XZ plane, and the outer periphery of transparent display 26 is supported by frame body 68. Transparent display 26 functions, for example, as an interior window installed between two adjacent rooms in a building, as well as a transparent display panel for displaying image 80 (to be described later). It should be noted that "transparent" need not necessarily mean a transparency of a 100% transmittance, but may be a transparency of a less than 100% transmittance, such as a transparency of an approximately 80-90% transmittance, or may be translucent with at least 30-50% transmittance with respect to visible light (specifically, 550 nm). It should be noted that the transmittance is the intensity ratio of incident light to transmitted light that is expressed as a percentage. The above-described first article 18 is disposed at a location in proximity to transparent display 26, specifically, in proximity to the lower portion of transparent display 26, to be opposite to the rear side (outdoor side) of transparent display 26.

Display surface 82 for displaying image 80 is provided on the front side (interior side) of transparent display 26. Image 80 is an image for creating an effect in space. In the example illustrated in FIG. 3, image 80 is a captured image of a starry sky, and is displayed on only a portion of display surface 82. In FIG. 3, the display range of image 80 is indicated by a dashed line. When first user 16 sees image 80 displayed on transparent display 26, first user 16 concurrently sees, through transparent display 26, first article 18 placed on shelf 78. In this manner, an effect is created in space in which first article 18 and image 80 are in harmony with each other.

While image 80 is displayed on transparent display 26, transparent display 26 is see-through from the front side to the rear side of transparent display 26. In other words, regardless of whether or not image 80 is displayed on transparent display 26, first user 16 in the room is capable of viewing first article 18 and the outdoor scenery through transparent display 26, in the same manner as a window of a general fixture.

It should be noted that image 80 may be either a still image or a moving image, or may be image content that includes both still images and moving images. Alternatively, image 80 may be an image coupled with music, etc. output from a speaker (not illustrated) installed in frame body 68, etc., for example.

Here, another display example of image 80 will be described. For example, image 80 may be an image that represents the scene of snow falling toward first article 18, and may be an image imitating snow grains (a plurality of grains of light) moving from an upper portion to a lower portion of transparent display 26 (from the positive side to the negative side of the Z axis).

Moreover, for example, image 80 may be an image that represents the scene of snowflakes falling toward first article 18, and may be an image imitating snowflakes moving from the upper portion to the lower portion of transparent display 26.

Moreover, for example, image 80 may be an image that represents the scene of a crescent moon floating in the sky, and may be an image imitating a crescent moon is displayed in proximity to the upper portion of transparent display 26. Since the image of the crescent moon is translucent, first user 16 is capable of viewing first article 18 and the outdoor scenery through transparent display 26, through the region of display surface 82 other than the image of the crescent moon. In addition, the image of the crescent moon may move on display surface 82 as time passes. Alternatively, image 80 may be an image of the moon waxing and waning as time passes.

Image 80 is not limited to the examples described above. For example, image 80 may be (a) an image in which a star or a shooting star in the night sky is represented by a plurality of grains of light, (b) an image in which small bubbles such as bubbles of champagne or sparkling wine are represented by a plurality of grains of light, and the inside of the bubbles is visible in a see-through manner, (c) an image in which sand falling in an hourglass is represented by a plurality of grains of light, and the portion other than the sand is visible in a see-through manner, etc.

In addition, image 80 may be an animated image. More specifically, image 80 may be an animated image representing, for example, a scene of snowflakes flurrying, in which only the outline of the snowflakes is represented by light grains or lines of light, and the rest of the image is visible in a see-through manner. In addition, image 80 may be an animated image according to the season. More specifically, image 80 may be, for example, (a) images of Santa Claus riding on a sleigh and reindeers in the case of the Christmas season, (b) images of pumpkins and ghosts in the case of the Halloween season, and so on. It is preferable that the above-described image 80 is an image in which only the outline of a main image is displayed and the other portions are visible in a see-through manner, rather than an image displayed on the entire of display surface 82 of transparent display 26.

In addition, image 80 need not necessarily an image displayed in only a single color, but may be an image displayed in a plurality of colors. Furthermore, image 80 may be an image that displays decorative characters, graphics, or the like such as a neon sign.

It is sufficient if image 80 is an image that can create an effect in space. Image 80 need not be an image that displays functional content such as a clock or weather forecast, for example. By displaying, on transparent display 26, image 80 specialized for creating an effect in space, it is possible to make users relaxed, who are exhausted by the flood of information in their daily lives.

On the other hand, for first user 16 who prefers functional usages, image 80 may include an image that displays functional content, such as a clock or weather forecast, for example. Alternatively, image 80 may include an image for informing first user 16 of a predetermined event, etc. More specifically, in the case where information processing device 4a is provided between, for example, a kitchen and a living room (or a corridor), when first user 16 leaves the kitchen while cooking in the kitchen, image 80 that includes an image that is reminiscent of flames may be displayed on transparent display 26. In this manner, it is possible to inform first user 16, for example, that the cookware is overheated.

4. Operation of Information Processing Device

Figure 4:
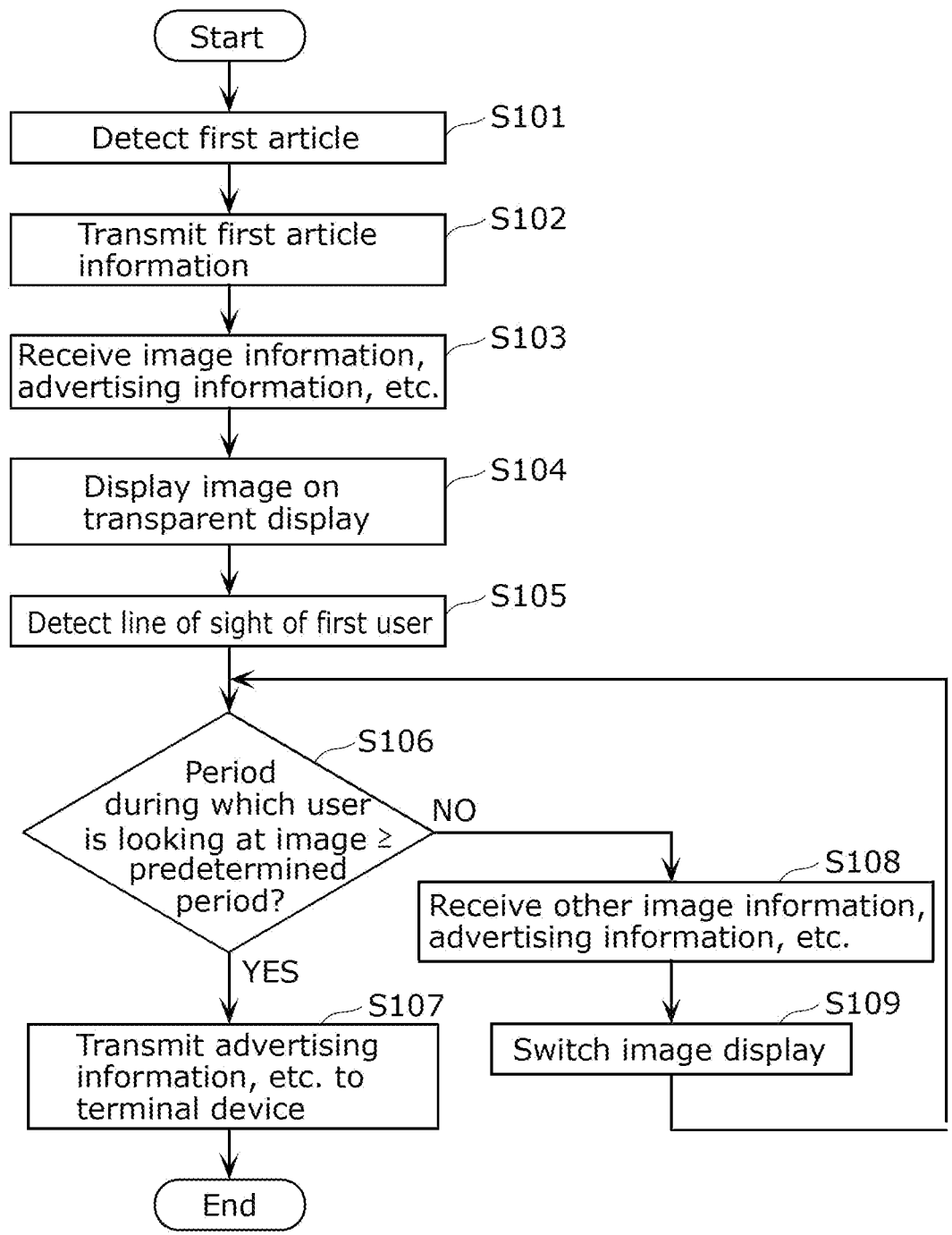
FIG. 4 is a flowchart of an operation of the information processing device according to the embodiment.
Figure 5:
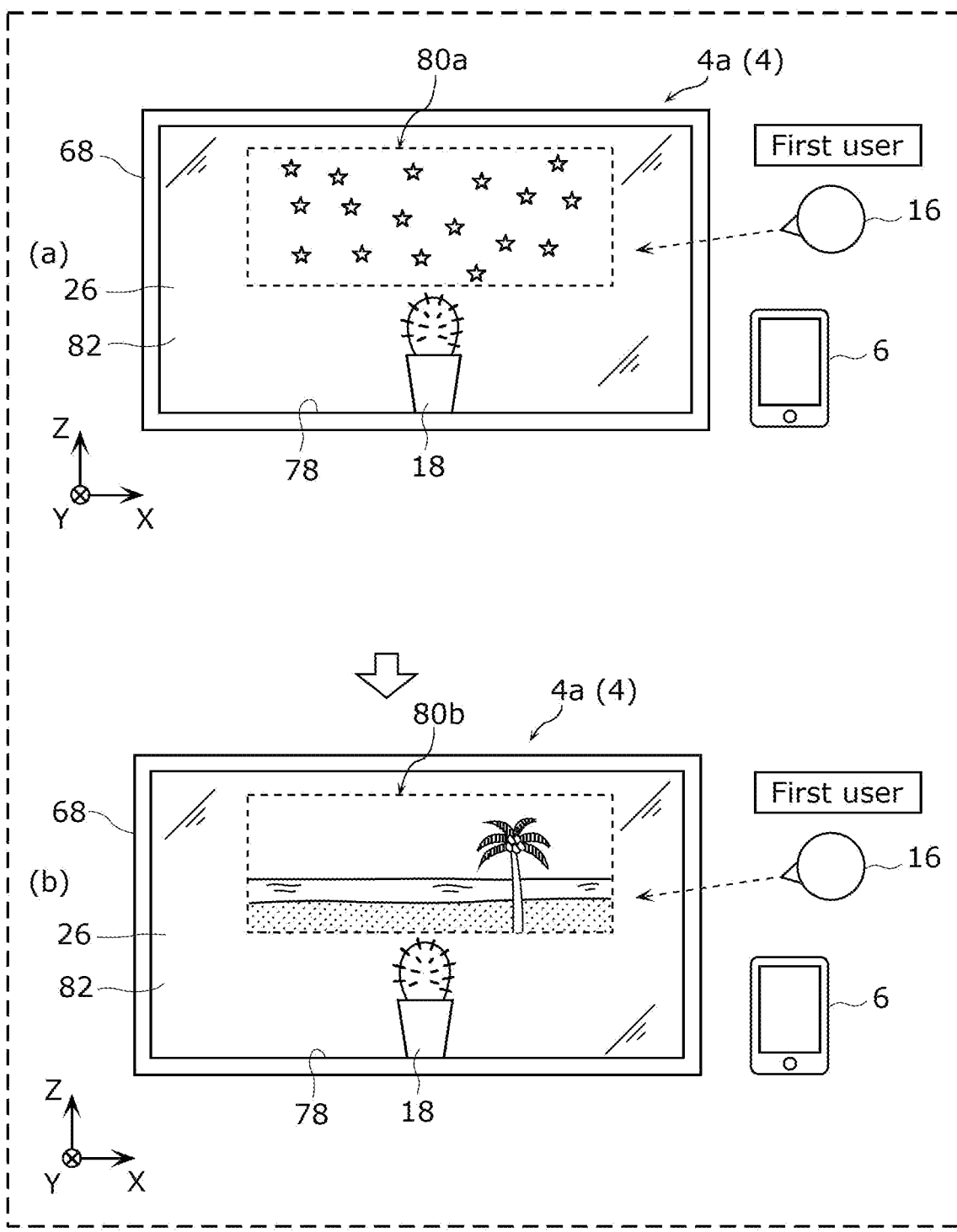
FIG. 5 illustrates display examples of images on a transparent display of the information processing device according to the embodiment.
Figure 6:
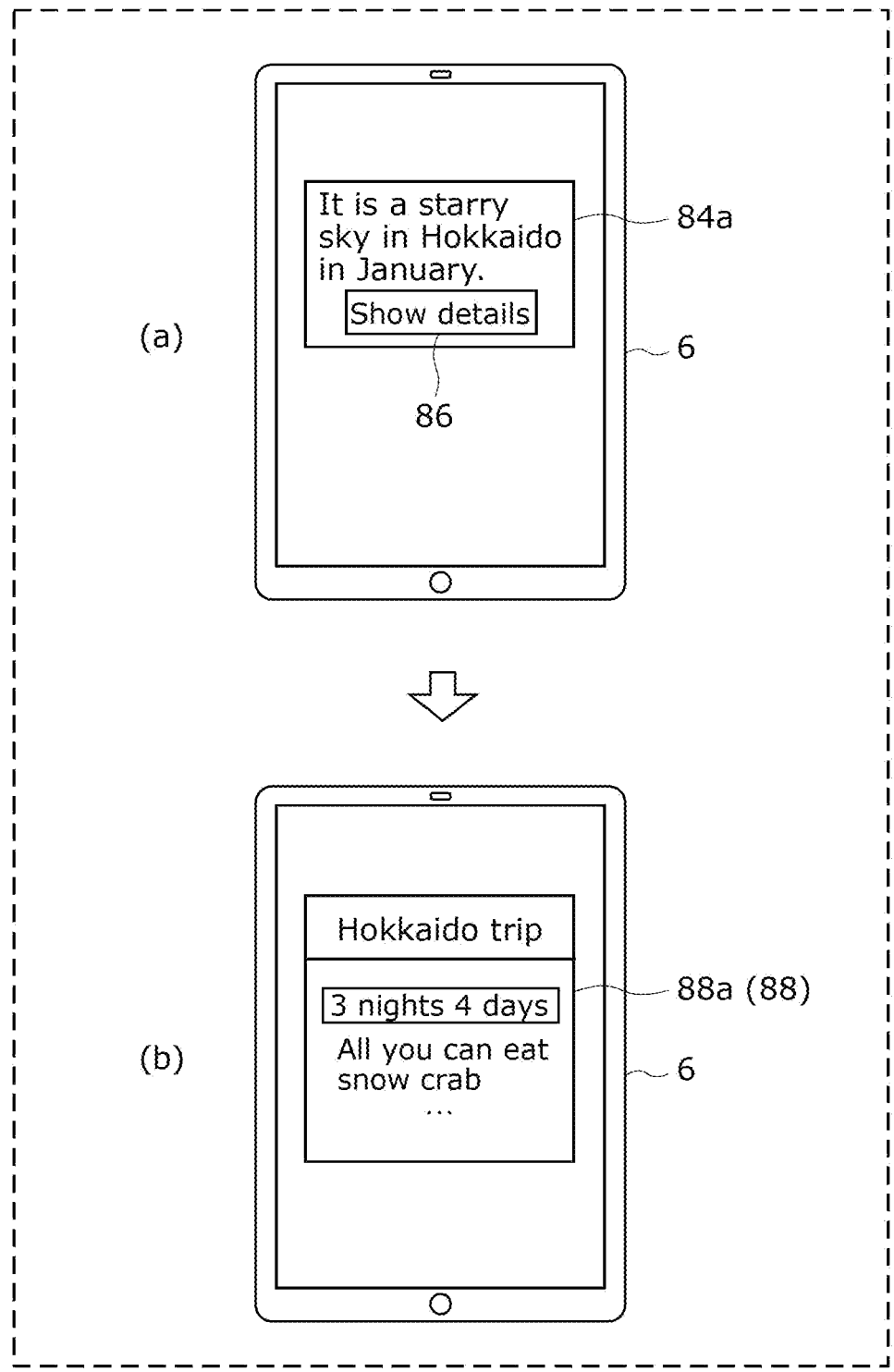
FIG. 6 illustrates a display example of an advertisement on a terminal device according to the embodiment.
Figure 7:
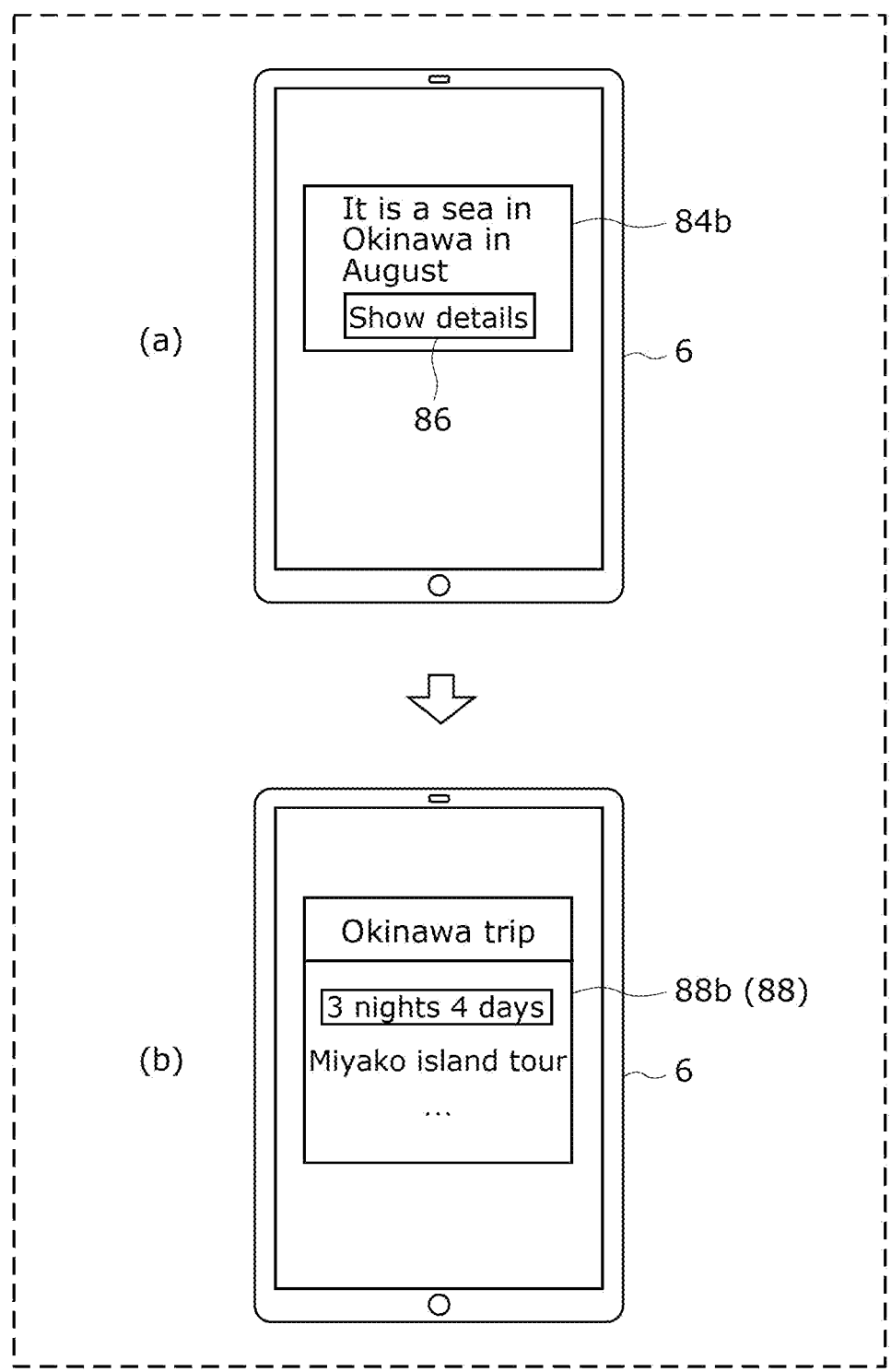
FIG. 7 illustrates another display example of an advertisement on the terminal device according to the embodiment.

Next, with reference to FIG. 4 to FIG. 7, an operation of information processing device 4a according to the embodiment will be described. FIG. 4 is a flowchart of an operation of information processing device 4a according to the embodiment. FIG. 5 illustrates display examples of image 80 on transparent display 26 of information processing device 4a according to the embodiment. FIG. 6 illustrates a display example of advertisement 88a (88) on terminal device 6 according to the embodiment. FIG. 7 illustrates another display example of advertisement 88b (88) on terminal device 6 according to the embodiment.

As illustrated in FIG. 4, first, when first user 16 places first article 18 (for example, a house plant) on shelf 78 of information processing device 4a, sensor 32 detects first article 18 placed on shelf 78 (S101). Sensor 32 outputs first article information related to first article 18 placed on shelf 78 to processor 28. Processor 28 transmits the first article information to manager 14 via communication unit 36 (S102).

Communication unit 64 of manager 14 receives the first article information from information processing device 4a. Processor 62 of manager 14 refers to image database 54 of content server 10 based on the received first article information to select image information indicating image 80a related to first article 18 (an example of a first image) (see (a) in FIG. 5 to be described later).

Hereinafter, the case will be described where, when first article 18 is a house plant, processor 62 of manager 14 selects image information indicating image 80a of a starry sky in Hokkaido in January which matches the house plant.

Processor 62 of manager 14 obtains the selected image information from content server 10, and transmits the obtained image information to information processing device 4a. At this time, processor 62 transmits, to information processing device 4a, the place information and time-of-year information associated with the image information along with the image information. For example, the place information indicates "Hokkaido" which is the place where image 80a was captured, and the time-of-year information indicates "January" which is the time of the year when image 80a was captured. Communication unit 36 of information processing device 4a receives the image information, the place information, and the time-of-year information from manager 14 (S103).

Processor 62 may transmit, to information processing device 4a, place information indicating the place which is associated with the image information and where first user 16 has no visit history. Alternatively, processor 62 may transmit, to information processing device 4a, place information indicating the place which is associated with the image information and where first user 16 has a visit history. At this time, processor 62 determines whether or not first user 16 has a visit history from the database where first user 16 stores data. Specifically, processor 62 determines whether or not first user 16 has a visit history from the image information stored in, for example, terminal device 6 of first user 16 or the position information embedded in the image information.

Processor 62 of manager 14 refers to user database 60 of cloud server 12 based on the received first article information to select the product or the service which is related to selected image 80a and which has been used by second user 20 who owns second article 22 (for example, house plant) related to first article 18.

Second user 20 does not always have to have second article 22 placed on shelf 78 of information processing device 4b at the same timing when first user 16 places first article 18 on shelf 78 of information processing device 4a. It is sufficient that second user 20 only owns second article 22.

Hereinafter, the case will be described where, when a product or a service of a Hokkaido trip has been used by second user 20 who owns second article 22 which is the same house plant as first article 18, processor 62 selects, as the product or the service, a Hokkaido trip which is related to image 80a of a starry sky in Hokkaido and which has been used by second user 20.

Moreover, processor 62 of manager 14 refers to advertisement database 48 of ad server 8 to select advertising information indicating advertisement 88a (an example of a first advertisement) for a Hokkaido trip as the selected product or service (see (b) in FIG. 6 to be described later). In other words, processor 62 selects advertising information based on second article information related to second article 22 placed opposite to the front side (interior side) or the rear side (outdoor side) of transparent display 26 of information processing device 4b and the usage history of the product or the service of second user 20. At this time, processor 62 refers to user database 60 of cloud server 12 to obtain the second article information and the usage history.

Processor 62 of manager 14 obtains the selected advertising information from ad server 8, and transmits the obtained advertising information to information processing device 4a. Communication unit 36 of information processing device 4a receives the advertising information from manager 14 (S103).

As illustrated in (a) of FIG. 5, processor 28 of information processing device 4a displays image 80a of a starry sky in Hokkaido on transparent display 26 based on the received image information (S104). Accordingly, first user 16 sees first article 18 through transparent display 26, and concurrently sees image 80a displayed on transparent display 26.

At this time, sensor 32 of information processing device 4a detects the line of sight of first user 16 present in front of transparent display 26 (S105). Processor 28 of information processing device 4a determines, based on the detection result of sensor 32, whether or not first user 16 is looking at both first article 18 and image 80a and whether or not the period during which first user 16 is looking at image 80a is greater than or equal to a predetermined period (for example, five seconds) (S106).

When first user 16 is looking at both first article 18 and image 80a and the period during which first user 16 is looking at image 80a is greater than or equal to the predetermined period (Yes in S106), processor 28 of information processing device 4a estimates that first user 16 is interested in image 80a, and transmits, to terminal device 6, advertising information indicating advertisement 88a related to a Hokkaido trip, place information indicating the place that is "Hokkaido", and time-of-year information indicating the time of the year that is "January" (S107).

Accordingly, as illustrated in (a) in FIG. 6, terminal device 6 displays dialog box 84a indicating the place information indicating the place that is "Hokkaido" and the time-of-year information indicating the time of the year that is "January". In dialog box 84a, for example, a message indicating that "it is a starry sky in Hokkaido in January" and detail button 86 are displayed. When a conversion is made by first user 16 performing an operation for selecting detail button 86 (that is, when user interface 40 receives input from first user 16), as illustrated in (b) in FIG. 6, advertisement 88a related to a Hokkaido trip is displayed on terminal device 6. Accordingly, first user 16 is informed of advertisement 88a.

The appealing effect can be measured by evaluating the conversion. The conversion refers to, for example, a) when the advertisement is for a product or a service, inquiries about the product or the service or product purchase, and b) when the advertisement is a website, action taken by a user on the informed advertisement such as application for membership registration or the like. In other words, the number of times the conversion was made relative to the informed advertisement or whether or not the conversion rate has improved can be used for evaluating the customer appeal.

Referring back to step S106, when first user 16 is looking at both first article 18 and image 80a and the period during which first user 16 is looking at image 80a is less than the predetermined period (No in S106), processor 28 of information processing device 4a estimates that first user 16 is not interested in image 80a, and requests manager 14 to transmit an image other than image 80a. In response to this request, processor 62 of manager 14 refers to image database 54 of content server 10 based on the received first article information to select image information which is related to first article 18 and which indicates image 80b different from image 80a (an example of a second image) (refer to (b) in FIG. 5 to be described later).

Hereinafter, the case will be described where, when first article 18 is a house plant, processor 62 of manager 14 selects image information indicating image 80b of a beach in Okinawa in August which matches the house plant.

Processor 62 of manager 14 obtains the selected image information from content server 10, and transmits the obtained image information to information processing device 4a. At this time, processor 62 transmits, to information processing device 4a, the place information and the time-of-year information associated with the image information, along with the image information. For example, the place information indicates "Okinawa" which is the place where image 80b was captured, and the time-of-year information indicates "August" which is the time of the year when image 80b was captured. Communication unit 36 of information processing device 4a receives the image information, the place information, and the time-of-year information from manager 14 (S108).

Processor 62 of manager 14 refers to user database 60 of cloud server 12 based on the received first article information to select the product or the service which is related to selected image 80b and which has been used by second user 20 who owns second article 22 (for example, a house plant) related to first article 18.

Hereinafter, the case will be described where a product or a service of an Okinawa trip has been used by second user 20 who owns second article 22 which is the same house plant as first article 18, processor 62 selects, as the product or the service, the Okinawa trip which is related to image 80b of a beach in Okinawa and which has been used by second user 20.

Moreover, processor 62 of manager 14 refers to advertisement database 48 of ad server 8 to select advertising information which indicates advertisement 88b related to an Okinawa trip as the selected product or service (an example of a second advertisement) (see (b) of FIG. 7 to be described later). Processor 62 of manager 14 obtains the selected advertising information from ad server 8, and transmits the obtained advertising information to information processing device 4a. Communication unit 36 of information processing device 4a receives the advertising information from manager 14 (S108).

As illustrated in (b) in FIG. 5, processor 28 of information processing device 4a switches the display on transparent display 26 from image 80a of a starry sky in Hokkaido to image 80b of a beach in Okinawa based on the received image information (S109). In other words, processor 28 stops displaying image 80a of a starry sky in Hokkaido and displays image 80b of a beach in Okinawa on transparent display 26. Accordingly, first user 16 sees first article 18 through transparent display 26, and also sees image 80b displayed on transparent display 26.

Referring back to step S106, when first user 16 is looking at both first article 18 and image 80b, and the period during which first user 16 is looking at image 80b is greater than or equal to the predetermined period (Yes in S106), processor 28 of information processing device 4a estimates that first user 16 is interested in image 80b, and transmits, to terminal device 6, advertising information indicating advertisement 88b related to an Okinawa trip, place information indicating the place that is "Okinawa", and time-of-year information indicating the time of the year that is "August" (S107).

Accordingly, as illustrated in (a) in FIG. 7, terminal device 6 displays dialog box 84b which indicates place information indicating the place that is "Okinawa" and time-of-year information indicating the time of the year that is "August". In dialog box 84b, for example, a message indicating that "it is a sea in Okinawa in August" and detail button 86 are displayed. When a conversion is made by first user 16 performing an operation for selecting detail button 86, as illustrated in (b) in FIG. 7, advertisement 88b related to an Okinawa trip is displayed on terminal device 6. Accordingly, first user 16 is informed of advertisement 88b.

Referring back to step S106, when first user 16 is looking at both first article 18 and image 80b, and the period during which first user 16 is looking at image 80b is less than the predetermined period (No in S106), steps S108 and S109 are performed in a similar manner to the above.

In the present embodiment, place information and time-of-year information are displayed in dialog box 84a (84b) on terminal device 6. However, the present disclosure is not limited to such an example, and, for example, an image of a Hokkaido trip (or Okinawa trip) uploaded to SNS by second user 20 may be displayed. For example, in the case where second user 20 is an influencer, first user 16 is likely to wish to go on a trip to Hokkaido (or Okinawa) like second user 20. Accordingly, it is possible to further improve the customer appeal of advertisement 88a (88b) to first user 16.

5. Use Case

Hereinafter, each use case of system 2 according to the present embodiment will be described.

5-1. Use Case 1

In use case 1, first article 18 is a pumpkin figure used in the Halloween season, and image 80 of bats (an example of a first image) related to first article 18 is displayed on transparent display 26. When it is estimated that first user 20 is not interested in bat image 80, the display on transparent display 26 is switched to another Halloween related image 80 (an example of a second image) from bat image 80 currently displayed.

In addition, advertisement 88 for a Halloween event which has been participated by second user 20 who owns second article 22 (for example, a skeletal figure used in the Halloween season) related to bat image 80 and related to first article 18 is displayed on terminal device 6.

Alternatively, in the case where first article 18 is a Christmas tree used in the Christmas season, image 80 of a reindeer related to first article 18 may be displayed on transparent display 26. In such a case, advertisement 88 for a Christmas cake which has been purchased by second user 20 who owns second article 22 (for example, a Santa clause figure used in the Christmas season) related to reindeer image 80 and related to first article 18 may be displayed on terminal device 6.

5-2. Use Case 2

In use case 2, first article 18 is a book such as a novel, and image 80 (an example of a first image) of a book related to first article 18 (for example, a book sequel to the book of first article 18 or a book of the same author as the book of first article 18) is displayed on transparent display 26. When it is estimated that first user 20 is not interested in book image 80, the display on transparent display 26 is switched to another book image 80 (an example of a second image) from book image 80 currently displayed.

In addition, on terminal device 6, advertisement 88 for a book (for example, a book indicated by image 80) which has been purchased by second user 20 who owns second article 22 related to book image 80 and related to first article (for example, the same book as the book of first article 18) is displayed.

For example, the purchase history of second user 20 may be displayed on terminal device 6. Moreover, on transparent display 26, image 80 may be displayed which indicates a state of second article 22 decorated by second user 20 (for example, second article 22 decorated in the central portion of shelf 78 of information processing device 4b such that the front page faces the front). Image 80 is, for example, generated based on position information indicating the position of second article 22 placed by second user 20 for decoration and decoration image information indicating a captured image of second article 22. At this time, for example, a message indicating that "your favorite smart influencer has decorated like this" (an example of user information related to second user 20) may be displayed on transparent display 26 along with image 80.

With this, for example, in the case where second user 20 is an influencer, first user 16 is likely to wish to purchase the same book as the book owned by second user 20. Accordingly, vicarious experience is prompted to first user 16 so that the customer appeal of advertisement 88 to first user 16 can be improved.

5-3. Use Case 3

In use case 3, first article 18 is a light snack such as a bagel, and image 80 (an example of a first image) of a cafe related to first article 18 (for example, a scenery seen through the window of a cafe) is displayed on transparent display 26. When it is estimated that first user 20 is not interested in cafe image 80, the display on transparent display 26 is switched to image 80 (an example of a second image) of another cafe from cafe image 80 currently displayed.

In addition, advertisement 88 for a cafe (for example, a cafe indicated by image 80) which has been used by second user 20 who owns second article 22 (for example, a light meal such as sandwich) related to cafe image 80 and related to first article 18 is displayed on terminal device 6.

On terminal device 6, for example, a) a coupon usable in the cafe, b) link information to a reservation site of the cafe, c) location information indicating the location of the cafe, or d) time-of-year information indicating the time of the year when image 80 was captured may be displayed. Alternatively, for example, an image of latte art or the like captured at a cafe and uploaded to SNS by second user 20 may be displayed on terminal device 6. At this time, for example, a message indicating that "your favorite smart influencer has been to this nice cafe" (an example of user information related to second user 20) may be displayed on terminal device 6. With this, for example, in the case where second user 20 is an influencer, first user 16 is likely to wish to go to the cafe to which second user 20 has been. Accordingly, vicarious experience is prompted to first user 16, so that the customer appeal of advertisement 88 to first user 16 can be further improved.

5-4. Use Case 4

In use case 4, first article 18 is wine, and image 80 (an example of a first image) of wine related to first article 18 (for example, wine produced in the same area) is displayed on transparent display 26. When it is estimated that first user 20 is not interested in wine image 80, the display on transparent display 26 is switched from wine image 80 currently displayed to image 80 of another kind of wine (an example of a second image).

Moreover, advertisement 88 for a wine which has been purchased by second user 20 who owns second article 22 related to wine image 80 and related to first article 18 (for example, the same kind of wine as first article 18) is displayed on terminal device 6. At this time, for example, a) suggestion for a trip to the place where winery of the above wine is located, b) link information to the site of a restaurant where the above wine is available, c) recipe of food that goes well with the above wine may be displayed on terminal device 6, along with advertisement 88. Alternatively, for example, a captured image of the wine, which is second article 22 decorated in the room, and uploaded by second user 20 to SNS may be displayed on terminal device 6. With this, for example, in the case where second user 20 is an influencer, first user 16 is likely to wish to drink the same wine as the wine which second user 20 drinks. Accordingly, it is possible to further improve the customer appeal of advertisement 88 to first user 16.

6. Advantageous Effects

As described above, when first user 16 places first article 18 on shelf 78 of information processing device 4a, advertisement 88 related to a product or a service which has been used by second user 20 who owns second article 22 related to first article 18 is displayed on terminal device 6.

At this time, since first article 18 and second article 22 are related to each other, first user 16 and second user 20 are likely to have similar hobbies and interests. Accordingly, first user 16 is likely to become highly interested in the product or the service which has been used by second user 20.

Hence, it is possible to improve the customer appeal of advertisement 88 to first user 16 by displaying, on terminal device 6, advertisement 88 related to the product or the service which has been used by second user 20.

7. Variations of Display of Advertisement

7-1. Variation 1

Figure 8:
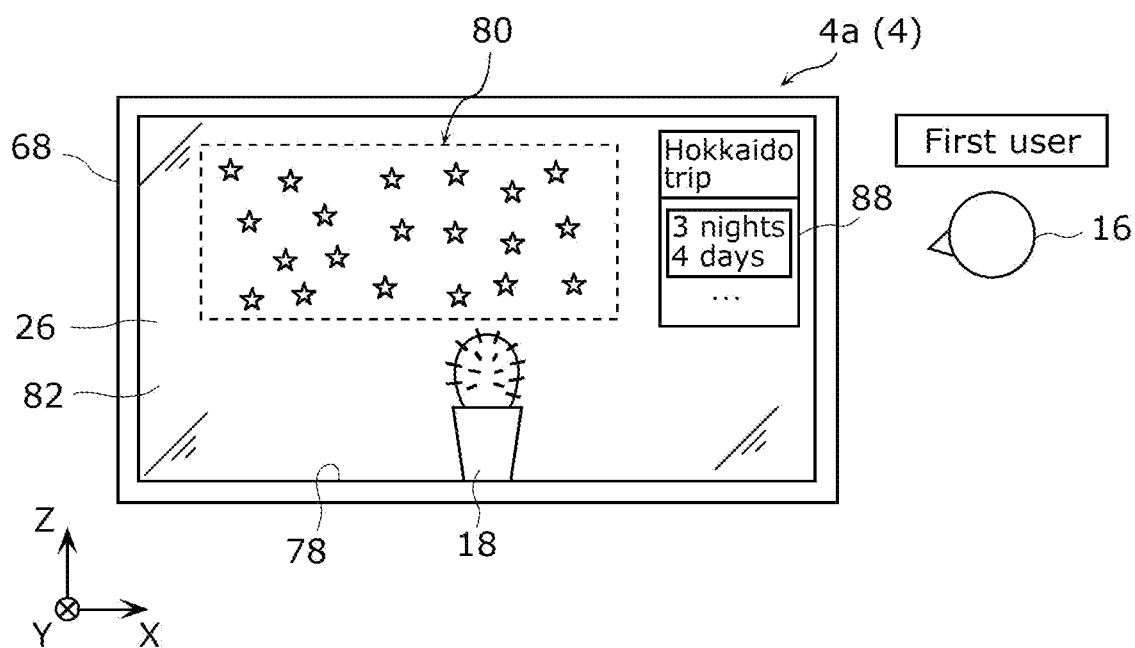
FIG. 8 illustrates Variation 1 of display of an advertisement.

With reference to FIG. 8, Variation 1 of display of advertisement 88 will be described. FIG. 8 illustrates Variation 1 of display of advertisement 88.

As illustrated in FIG. 8, in the present variation, advertisement 88 is displayed on display surface 82 of transparent display 26 of information processing device 4a, instead of terminal device 6 described above.

At this time, in order to enhance the visibility of advertisement 88, in the plane view of XZ plane of transparent display 26, it is preferable that advertisement 88 is displayed on the region of transparent display 26 which does not overlap with image 80, and that advertisement 88 is displayed on the region of transparent display 26 which does not overlap with first article 18.

In the present variation, terminal device 6 may be omitted from system 2. Cloud server 12 may be further omitted from system 2.

In addition, in the present variation, when system 2 includes terminal device 6, first user 16 may arbitrarily switch the display destination of advertisement 88 between transparent display 26 and terminal device 6 by operating input unit 34 of information processing device 4a (or terminal device 6).

7-2. Variation 2

Figure 9:
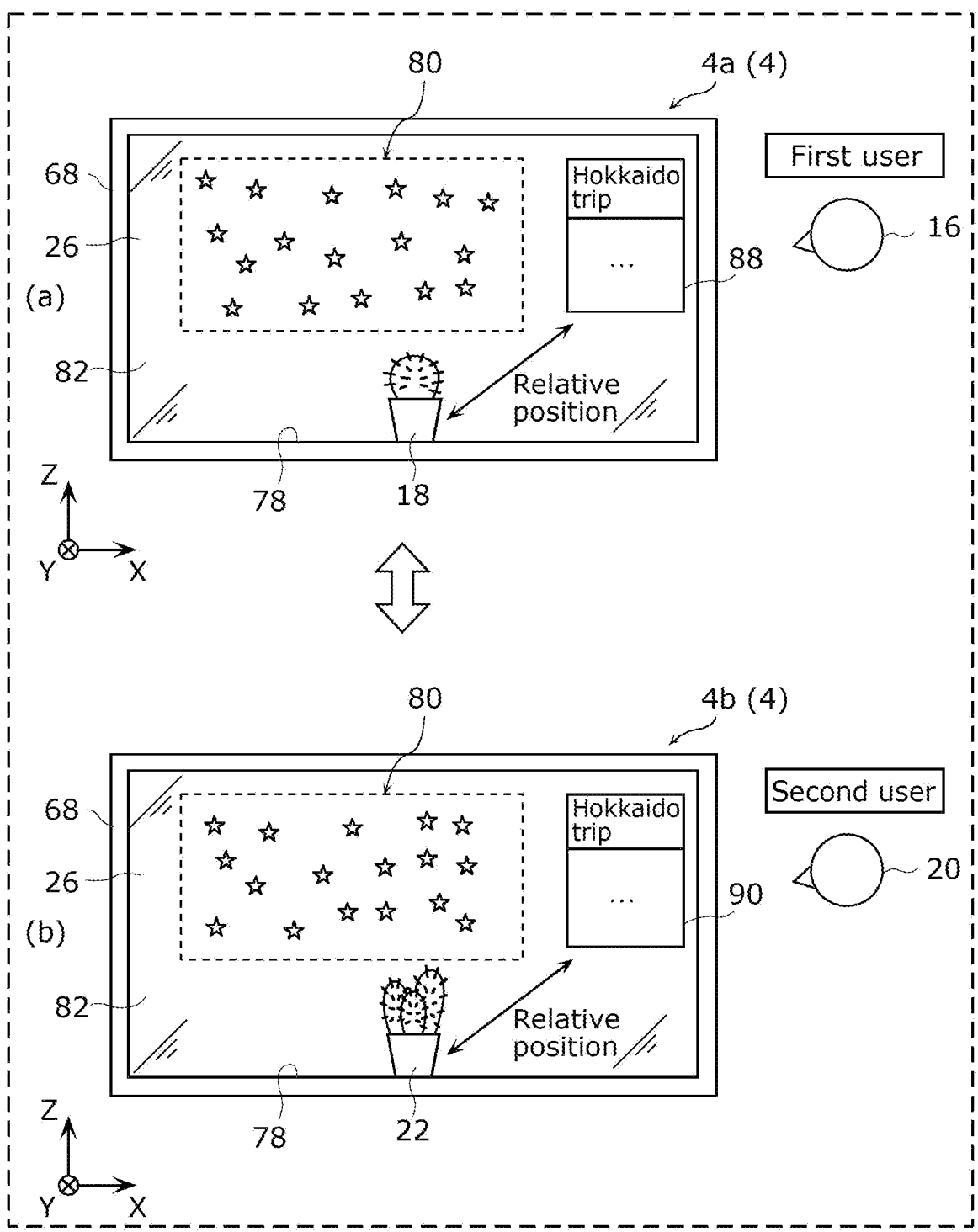
FIG. 9 illustrates Variation 2 of display of an advertisement.

With reference to FIG. 9, Variation 2 of display of advertisement 88 will be described. FIG. 9 illustrates Variation 2 of display of advertisement 88.

As illustrated in (b) of FIG. 9, advertisement 90 related to a product or a service (an example of a third advertisement) is displayed on transparent display 26 of information processing device 4b. At this time, information processing device 4b transmits, to cloud server 12, the relative position information indicating the position of advertisement 90, which led second user 20 to use the product or the service, relative to second article 22. Manager 14 obtains the relative position information from user database 60 of cloud server 12, and transmits the obtained relative position information to information processing device 4a.

As illustrated in (a) of FIG. 9, processor 28 of information processing device 4a displays advertisement 88 on transparent display 26 of information processing device 4a based on the relative position information from manager 14. At this time, the position of advertisement 88 relative to first article 18 is substantially the same as the position of advertisement 90 relative to second article 22. The above two relative positions do not always have to completely match each other, but may slightly deviate from each other.

The position of advertisement 90 relative to second article 22 is considered to be an effective display position because there is a record that second user 20 has been led to use the product or the service of advertisement 90. Accordingly, it is possible to increase the possibility that first user 16 is led to the conversion by mirroring the display position of advertisement 90 on transparent display 26 of information processing device 4b, to transparent display 26 of information processing device 4a.

Other Variations

Although the information display method and the information processing device according to one or more aspects have been described based on the above-described embodiment, the present disclosure is not limited to the above-described embodiment. Other forms in which various modifications apparent to those skilled in the art are applied to the embodiment, or forms structured by combining structural components of different embodiments may be included within the scope of the one or more aspects, unless such changes and modifications depart from the scope of the present disclosure.

In the embodiment described above, the case has been described where transparent display 26 functions as an interior window, but the present disclosure is not limited to such an example. It may be that, for example, transparent display 26 functions as a transparent exterior window installed in an opening formed in the exterior wall of a building, or a partition window dividing one room in a building into a plurality of spaces.

In the embodiment described above, first article 18 is placed at a position opposite to the rear side (interior side) of transparent display 26, but the present disclosure is not limited to such an example. For example, first article 18 may be placed at a position in proximity to the lower portion of transparent display 26 and opposite to the front side (interior side) of transparent display 26, and may be placed at any position in proximity to transparent display 26.

In the embodiment described above, processor 28 of information processing device 4a displays image 80 (80a, 80b) on a portion of transparent display 26, but the present disclosure is not limited to such an example. Processor 28 may display image 80 (80a, 80b) on the entire region of transparent display 26.

In the embodiment described above, in system 2, ad server 8, content server 10, cloud server 12, and manager 14 are physically separate servers, but the present disclosure is not limited to such an example. For example, ad server 8, content server 10, cloud server 12, and manager 14 may be formed of a single DMP. Alternatively, part of data may be stored in a server other than ad server 8, content server 10, cloud server 12, and manager 14.

In the embodiment described above, first article 18 is detected by sensor 32 of information processing device 4a, but the present disclosure is not limited to such an example. It may be that first article 18 is detected by, for example, a sensor included in terminal device 6 or various sensors provided in the room.

Each of the structural components in the above-described embodiment may be configured in the form of an exclusive hardware product, or may be realized by executing a software program suitable for each of the structural components. Each of the structural components may be realized by means of a program executing unit, such as a central processing unit (CPU) and a processor, reading and executing the software program recorded on a recording medium such as a hard disk or a semiconductor memory.

In addition, some or all of the functions of the information processing device according to the above-described embodiment may be implemented by a processor, such as a CPU, executing a program.

Part or all of the structural components constituting the respective devices may be configured as an IC card which can be attached and detached from the respective devices or as a stand-alone module. The IC card or the module is a computer system configured from a microprocessor, a ROM, a RAM, and so on. The IC card or the module may also include the aforementioned super-multi-function LSI. The IC card or the module achieves its function through the microprocessor's operation according to the computer program. The IC card or the module may also be implemented to be tamper-resistant.

The present disclosure may also be realized as the method described above. In addition, the present disclosure may be a computer program for realizing the previously illustrated method using a computer, and may also be a digital signal including the computer program. Furthermore, the present disclosure may also be realized by storing the computer program or the digital signal in a non-transitory computer readable recording medium such as flexible disc, a hard disk, a CD-ROM, an MO, a DVD, a DVD-ROM, a DVD-RAM, a BD (Blu-ray (registered trademark) Disc), and a semiconductor memory. Furthermore, the present disclosure may also include the digital signal recorded in these recording media. In addition, the present disclosure may also be realized by the transmission of the aforementioned computer program or digital signal via a telecommunication line, a wireless or wired communication line, a network represented by the Internet, a data broadcast and so on. Furthermore, the present disclosure may also be a computer system including a microprocessor and a storage device, in which the storage device stores the aforementioned computer program and the microprocessor operates according to the computer program. It may be that the storage device includes a recording medium, more specifically, a semiconductor memory in the CPU such as a register or a cache memory, a main memory (RAM), a storage (an external storage device/an auxiliary storage device), and the storage may be an online storage or an offline storage. In addition, by transferring the program or the digital signal by recording onto the aforementioned recording media, or by transferring the program or digital signal via the aforementioned network and the like, execution using another independent computer system is also made possible.

INDUSTRIAL APPLICABILITY

The present disclosure is useful, for example, for an information processing device which includes a transparent display.

The invention claimed is:

1. An information display method performed by an information processing device which includes (i) a sensor which detects a line of sight of a first user, (ii) a frame body having a quadrilateral shape in a plan view of an XZ plane in an XYZ coordinate system, the frame body including an upper wall, a lower wall, a left side wall, and a right side wall, the upper wall and the lower wall opposing each other in the Z-axis direction, and the left side wall and the right side wall opposing each other in the X-axis direction, (iii) a first transparent display having the quadrilateral shape in the plan view of the XZ plane and being supported at a rear side of the frame body in the Y-axis direction, the first transparent display including a display surface which displays an image, and (iv) a processor, the information display method comprising the following performed by the processor:

obtaining first article information related to a first article placed on the lower wall of the frame body so as to be in front of the first transparent display in the Y-axis direction, the first article being owned by the first user;

obtaining, based on the first article information, (i) a first advertisement related to a first product or a first service which has been used by a second user and (ii) a first image related to the first advertisement, the second user being different from the first user, and the second user owning a second article related to the first article;

displaying, on the display surface of the first transparent display, the first image such that the first user concurrently sees through the display surface (i) the first image displayed on the display surface of the first transparent display and (ii) the first article through the display surface of the first transparent display;

determining, based on the line of sight of the first user detected by the sensor, whether or not a period during which the first user is looking at the displayed first image is greater than or equal to a predetermined period;

when it is determined that the period during which the first user is looking at the displayed first image is greater than or equal to the predetermined period, informing the first user of the first advertisement by displaying the first advertisement on a region of the display surface of the first transparent display, the region not overlapping with the first article; and when it is determined that the period during which the first user is looking at the displayed first image is not greater than or equal to the predetermined period,
stopping displaying the first image on the first transparent display,
obtaining, based on the first article information, (i) a second advertisement related to a second product or a second service which has been used by the second user and (ii) a second image related to the second advertisement,
displaying, on the display surface of the first transparent display, the second image such that the first user concurrently sees through the display surface (i) the second image displayed on the display surface of the first transparent display and (ii) the first article through the display surface of the first transparent display,
determining, based on the line of sight of the first user detected by the sensor, whether or not a period during which the first user is looking at the displayed second image is greater than or equal to the predetermined period, and
when it is determined that the period during which the first user is looking at the displayed second image is greater than or equal to the predetermined period, informing the first user of the second advertisement by displaying the second advertisement on a region of the display surface of the first transparent display, the region not overlapping with the first article.

2. The information display method according to claim 1, further comprising the following performed by the processor:
informing the first user of place information indicating a place related to the first image,
wherein the place is a place where the first user has no visit history, and
the visit history is obtained from a database where the first user stores data.

3. The information display method according to claim 2, wherein the informing of the first user of the first advertisement includes informing the first user of the first advertisement, when an input made by the first user for the place information is received by a user interface.

4. The information display method according to claim 1, further comprising the following performed by the processor:
informing the first user of place information indicating a place related to the first image,
wherein the place is a place where the first user has a visit history, and
the visit history is obtained from a database where the first user stores data.

5. The information display method according to claim 1, further comprising the following performed by the processor:
obtaining time-of-year information indicating a time of year related to the first image; and
informing the first user of the time-of-year information obtained.

6. The information display method according to claim 1, further comprising the following performed by the processor:
obtaining position information and decoration image information, the position information indicating a position of the second article placed by the second user for decoration, the decoration image information indicating an image of the second article captured,
wherein the first image is displayed on the display surface of the first transparent display based on the position information and the decoration image information, the first image indicating a decorated state of the second article.

7. The information display method according to claim 1, wherein in the obtaining of the first advertisement, the first advertisement is obtained based on second article information and a usage history of the product or the service of the second user, the second article information being related to the second article placed in front of or behind a second transparent display different from the first transparent display.

8. The information display method according to claim 7, further comprising the following performed by the processor:
obtaining relative position information when a third advertisement related to a third product or a third service is displayed on the second transparent display, the relative position information indicating a position of the third advertisement relative to the second article, the third advertisement having led the second user to use the third product or the third service,
wherein the informing the first user of the first advertisement includes displaying the first advertisement on the first transparent display based on the relative position information.

9. The information display method according to claim 1, wherein the informing the first user of the first advertisement includes informing the first user of user information related to the second user along with the first advertisement.

10. The information display method according to claim 1, wherein the informing the first user of the first advertisement includes displaying the first advertisement on a terminal device that is operated by the first user.

11. An information processing device, comprising:
a sensor which detects a line of sight of a first user;
a frame body which has a quadrilateral shape in a plan view of an XZ plane in an XYZ coordinate system, the frame body including an upper wall, a lower wall, a left side wall, and a right side wall, the upper wall and the lower wall opposing each other in the Z-axis direction, and the left side wall and the right side wall opposing each other in the X-axis direction, a transparent display which has the quadrilateral shape in the plan view of the XZ plane and being supported at a rear side of the frame body in the Y-axis direction, the transparent display including a display surface which displays an image; and a processor, wherein the processor performs the following:

obtaining first article information related to a first article placed on the lower wall of the frame body so as to be in front of the transparent display in the Y-axis direction, the first article being owned by the first user;

obtaining, based on the first article information, (i) a first advertisement related to a first product or a first service which has been used by a second user and (ii) a first image related to the first advertisement, the second user being different from the first user, and the second user owning a second article related to the first article;

displaying, on the display surface of the transparent display, the first image such that the first user concurrently sees through the display surface (i) the first image displayed on the display surface of the transparent display and (ii) the first article through the display surface of the transparent display;

determining, based on the line of sight of the first user detected by the sensor, whether or not a period during which the first user is looking at the displayed first image is greater than or equal to a predetermined period;

when it is determined that the period during which the first user is looking at the displayed first image is greater than or equal to the predetermined period, informing the first user of the first advertisement by displaying the first advertisement on a region of the display surface of the first transparent display, the region not overlapping with the first article; and when it is determined that the period during which the first user is looking at the displayed first image is not greater than or equal to the predetermined period, stopping displaying the first image on the transparent display, obtaining, based on the first article information, (i) a second advertisement related to a second product or a second service which has been used by the second user and (ii) a second image related to the second advertisement, displaying, on the display surface of the transparent display, the second image such that the first user concurrently sees through the display surface (i) the second image displayed on the display surface of the transparent display and (ii) the first article through the display surface of the transparent display, determining, based on the line of sight of the first user detected by the sensor, whether or not a period during which the first user is looking at the displayed second image is greater than or equal to the predetermined period, and when it is determined that the period during which the first user is looking at the displayed second image is greater than or equal to the predetermined period, informing the first user of the second advertisement by displaying the second advertisement on a region of the display surface of the first transparent display, the region not overlapping with the first article.

* * * * *